3,320,027
CLAY BLEACHING UNDER NON-OXIDIZING ATMOSPHERES
Robert N. Maynard and Joseph Iannicelli, Macon, Ga., assignors to J. M. Huber Corporation, Locust, N.J., a corporation of New Jersey
No Drawing. Filed May 5, 1964, Ser. No. 365,135
5 Claims. (Cl. 23—110)

This invention relates to a method of increasing the whiteness of kaolin clays by chemical means in an inert atmosphere.

Naturally occurring clays vary considerably in their color properties, even when produced from mines in the same locality. The color of the clays can vary from almost white to brown. Often a clay is rejected as being unsuitable for commercial use solely on the basis of color, even when its other physical properties such as viscosity and particle size distribution are within desired limits.

Clay minerals comprise three main groups; namely, the kaolin group, the montmorillonite group and the illite group. These groups are distinguished not only by the differences in chemical composition, but, more importantly, by physical differences as influenced by their crystal structure.

The kaolin group as distinguished from the others contains a stable, non-expanding crystal lattice consisting of a gibbsite sheet condensed with a silica sheet.

Clay minerals belonging to the kaolin group are kaolinite ($Al_2O_3 \cdot 2SiO_2 \cdot 2H_2O$), nacrite, dickite, and halloysite. Kaolinite is by far the most important member of this group.

The naturally occurring kaolin deposits contain contaminants which cause discoloration of the clay. Usually iron and titanium compounds are responsible for this discoloration.

The method by which these contaminants are removed and the color of the clay improved is traditionally chemical bleaching.

In the treatment of clays, it is common practice to first blunge the clay to prepare a slip or slurry of the clay in water. The slip may contain any desired quantity of clay to form a slurry of the desired consistency, which may vary from thin to a mud too thick to pour. The concentrations usually required vary from about 10 to about 50 pounds of clay in 100 pounds of water. It is also common practice to add to the clay slip a peptizing agent such as tetrasodium pyrophosphate, sodium carbonate, sodium pyrophosphate, sodium silicate, sodium hexametaphosphate, or sodium metaphosphate, which decreases the viscosity of the slip. The peptizing agent converts the slip to a watery consistency immediately, whereupon the mica and other coarse materials settle out in a few minutes as a heavy layer in the bottom of the vessel containing the slip and can be readily separated from the slip.

It is also common practice to improve the color of clay by a bleaching process which usually comprises treating the clay with an agent which will reduce the iron from the ferric to the ferrous state. The addition of such bleaching agents as well as acid or alum coagulants renders the slip viscous. Normally the slip is then filtered and dried to produce the final clay product having a brightness somewhat greater than the brightness of the starting product. Zinc or sodium hydrosulfite bleaching reducing agents, together with alum or acid coagulants are commonly used. Other reducing chemicals have been used in place of the hydrosulfite but in general the system is the same. These systems have not, however, been successful in adequately increasing the brightness of the darker deposits of kaolin.

An object of this invention is to provide a novel method of treating clay to increase the brightness thereof.

Another object of this invention is to provide a novel method of treating sub-marginal clays to increase the brightness thereof to commercially acceptable standards.

A further object of this invention is to provide a method of economically increasing the brightness of kaolin clays by levels greater than heretofore reached.

Other objects and advantages of this invention will become apparent from the description in the following specification.

We have discovered that the brightness of kaolin clays can be significantly increased by treating the clay with conventional hydrosulfite reducing bleaching agents in a non-oxidizing atmosphere. By excluding oxidizing gases the ferrous compounds formed are prevented from oxidizing back to the ferric state. When in the ferrous state the iron compounds are readily washed and separated from the clay, thus removing a major discolorant. If, however, the brightening process is carried out under conditions wherein oxygen is present, the hydrosulfite reducing bleaching agent is rendered less effective because it reacts with the oxygen. Furthermore, if, after the bleaching operation, oxygen is present, it will oxidize some of the ferrous compounds back to ferric compounds before the former can be removed from the clay.

When carrying out the complete hydrosulfite bleaching process under a non-oxidizing atmosphere, this problem is eliminated. Typical inert atmospheres are nitrogen or carbon dioxide.

In this novel process the kaolin clay is put under a non-oxidizing atmosphere in an enclosed system after the crude clay is blunged, screened, fractionated and slurried to a solids content of about 30%. It is also possible to deaerate the kaolin clay slurry by boiling or other known means, prior to putting in the enclosed system. By this, it is possible to achieve a very efficient reducing action by the hydrosulfite agent.

Under the non-oxidizing atmosphere, the slurry is treated by adding thereto 0.10% to 1.0% of alum based on the dry weight of the clay and from about 0.1% to 3% of a hydrosulfite, also based on the dry weight of the clay. During the addition of the chemicals the slurry is slowly agitated and the agitation is continued for a period of time of about 30 minutes. The slurry is then filtered and washed under the non-oxidizing atmosphere, then it is dried and recovered.

It is also possible to conduct the bleaching in a closed system which is 100% full, thus excluding any atmosphere including oxidizing atmospheres. This is preferred when the slurry is deaerated prior to treatment with the hydrosulfite system.

The following examples illustrate the invention.

*Example I*

25 grams of low color crude kaolin clay was placed in a 500 ml. 3-necked flask equipped with a condenser and an inlet for nitrogen. Water was added to make a 30% slip. The system was flushed with nitrogen and nitrogen was kept flowing through the system during the reaction. The temperature of the clay slip was raised to 60° C. 0.5% zinc sulfite was added, followed by the addition of 0.3% alum, both percents being based upon the weight of the dry clay. The resulting slip was agitated for one-half hour by a magnetic stirrer at 60° C. The 3-neck flask was capped, being careful not to contaminate contents with air. The flask plus bleached clay slip was then placed in a deaerated dry box where it was filtered and washed with deaerated water. The sample was then dried at 100° C. The brightness of the clay was 86. The brightness of the same crude bleached under the same conditions in the presence of air was 81.

Example II

The process of Example I was repeated except the crude clay used was a regular color crude. The brightness of the product was 88 compared to 86.5 brightness of the same crude bleached in the presence of air.

Example III

The process of Example I was repeated except the crude clay slurry was deaerated by boiling before bleaching. The brightness of the product was 86.3.

As shown in the examples it is critical to the process of this invention that the entire process be carried out in the absence of oxygen or oxidizing gases. The non-oxidizing atmosphere can either consist of inert gases or a completely filled enclosed system containing deaerated clay slurry. In either case, no appreciable oxidation should be allowed to take place until all the ferrous iron is removed from the system.

Having thus described the preferred embodiments of the invention, it should be understood that numerous adaptations may be resorted to without departing from the scope of the appended claims.

We claim:

1. In the process of brightening kaolin clay in an aqueous slurry by the use of hydrosulfite bleaching agents, the improvement which consists of carrying out the process in a non-oxidizing atmosphere.
2. The process of claim 1 wherein the non-oxidizing atmosphere is nitrogen.
3. The process of claim 1 wherein the non-oxidizing atmosphere is carbon dioxide.
4. The process of claim 1 wherein the hydrosulfite bleaching agent is zinc hydrosulfite.
5. The process of claim 1 wherein the clay is deaerated before bleaching.

References Cited by the Examiner
UNITED STATES PATENTS

| | | | |
|---|---|---|---|
| 2,180,742 | 11/1939 | Lyons | 23—110 X |
| 2,339,594 | 1/1944 | Williams | 23—110 |

OSCAR R. VERTIZ, *Primary Examiner.*

A. GREIF, *Assistant Examiner.*